April 29, 1941.　　C. J. FREDERIKSEN　　2,240,292
TRACTOR MOWER
Filed Nov. 29, 1939　　3 Sheets-Sheet 1

INVENTOR:
CARL J. FREDERIKSEN
BY
ATTORNEYS.

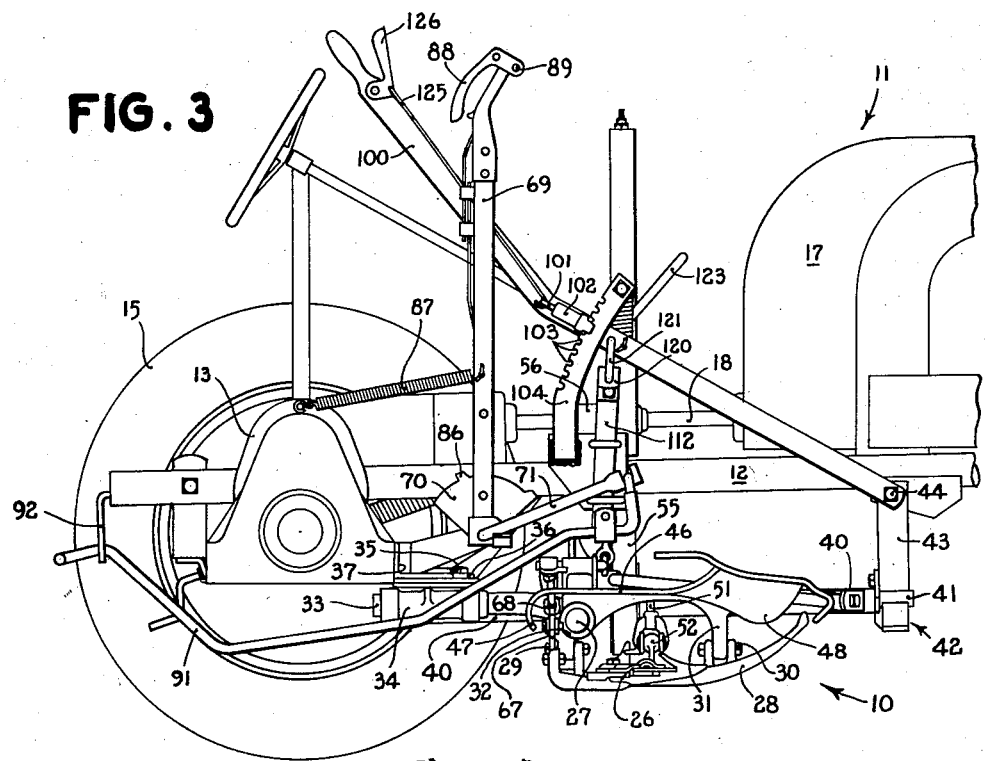
FIG. 3
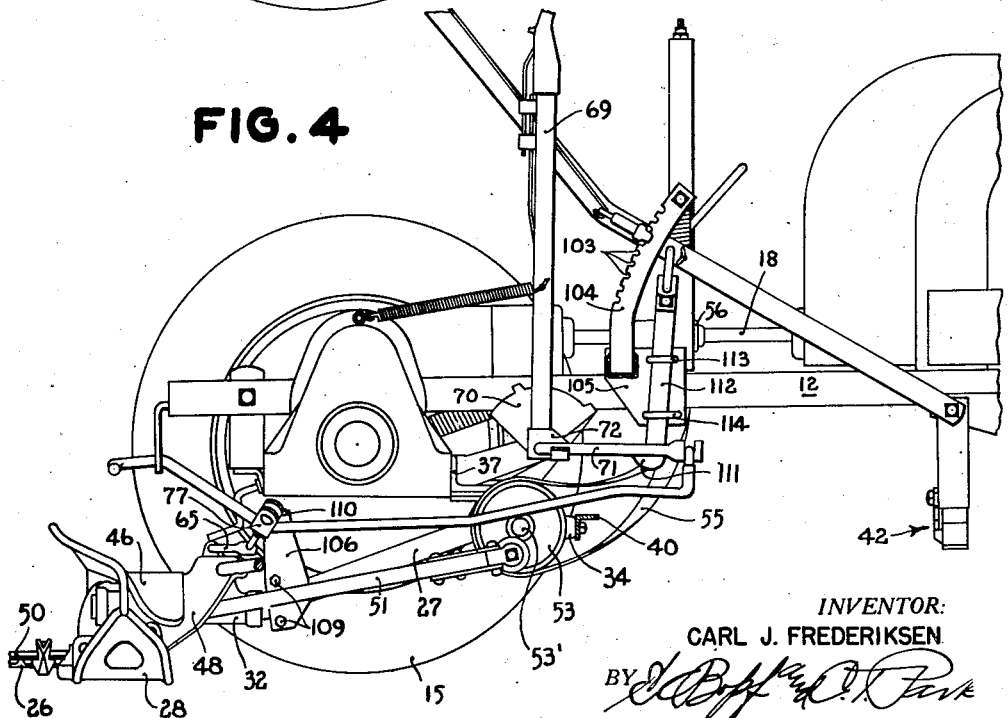
FIG. 4
INVENTOR:
CARL J. FREDERIKSEN
ATTORNEYS.

INVENTOR:
CARL J. FREDERIKSEN
ATTORNEYS.

Patented Apr. 29, 1941

2,240,292

UNITED STATES PATENT OFFICE 2,240,292

TRACTOR MOWER

Carl J. Frederiksen, Moline, Ill., assignor to Deere & Company, Moline, Ill., a corporation of Illinois Application November 29, 1939, Serial No. 306,690

16 Claims. (Cl. 56—25)

The present invention relates to tractor mowers and has for its principal object the provision of novel and improved lifting and supporting mechanism for the mower cutter bar. More specifically, a further object of my invention is concerned with the provision, in a mower of the type pivotally mounted on a tractor and adapted to swing rearwardly to avoid damage to the cutter bar when the latter strikes an obstruction in the field, of improved lifting mechanism wherein the control levers are mounted on the tractor body and are connected by novel linkage mechanism to the cutter bar structure, the linkage providing for rearward swinging movement of the cutter bar structure relative to the lifting levers on the tractor. A further and related object concerns a linkage connection from a control lever on the tractor to lifting mechanism on the cutter bar structure which is automatically restored to operating position when the cutter bar structure is swung back to its normal operating position after it has been released to clear an obstruction in the field.

A further object of my invention relates to the provision of a lifting and supporting mechanism for the supporting arm of a mower cutter bar by means of which the inner ends of the cutter bar can be supported at a predetermined distance above the level of the ground on which the wheels of the tractor are operating. This provision is used where the mower is used for cutting the grass along the sides of a highway where the tractor runs along a curbing and cuts grass in a parkway above the curbing. By supporting the cutter bar in this manner, the latter is held in operating position as the tractor crosses a street intersection and thus does not require raising the mower every time it is necessary to cross an intersection.

Still another object has to do with the provision of latch mechanism between the supporting lever and the cutter bar supporting arm, the latch mechanism being disengageable when the cutter bar structure swings rearwardly to clear an obstruction, but after the structure has been restored to operating position, the latch mechanism can be reconnected by merely lowering the control lever to pick up the supporting arm.

These and other objects and advantages will be apparent after a consideration of the following description in which reference is had to the appended drawings, in which Figure 1 is a perspective view of a portion of a mower mounted on a tractor and showing the lifting and supporting mechanism for the cutter bar and the cutter bar supporting arm;

Figure 2 is a fragmentary side elevational view showing the details of the latch mechanism for connecting the control lever with the cutter bar supporting arm;

Figure 3 is a side elevation of the mower shown in Figure 1 mounted on a tractor in which the near traction wheel has been removed to show more clearly the details of the invention, the cutter bar being in operating position at a level above the level of the ground on which the tractor is operating;

Figure 4 is a side elevation in which the mower is shown in trailing position behind the tractor after it has been swung rearwardly to clear an obstruction in the field.

Figure 1:
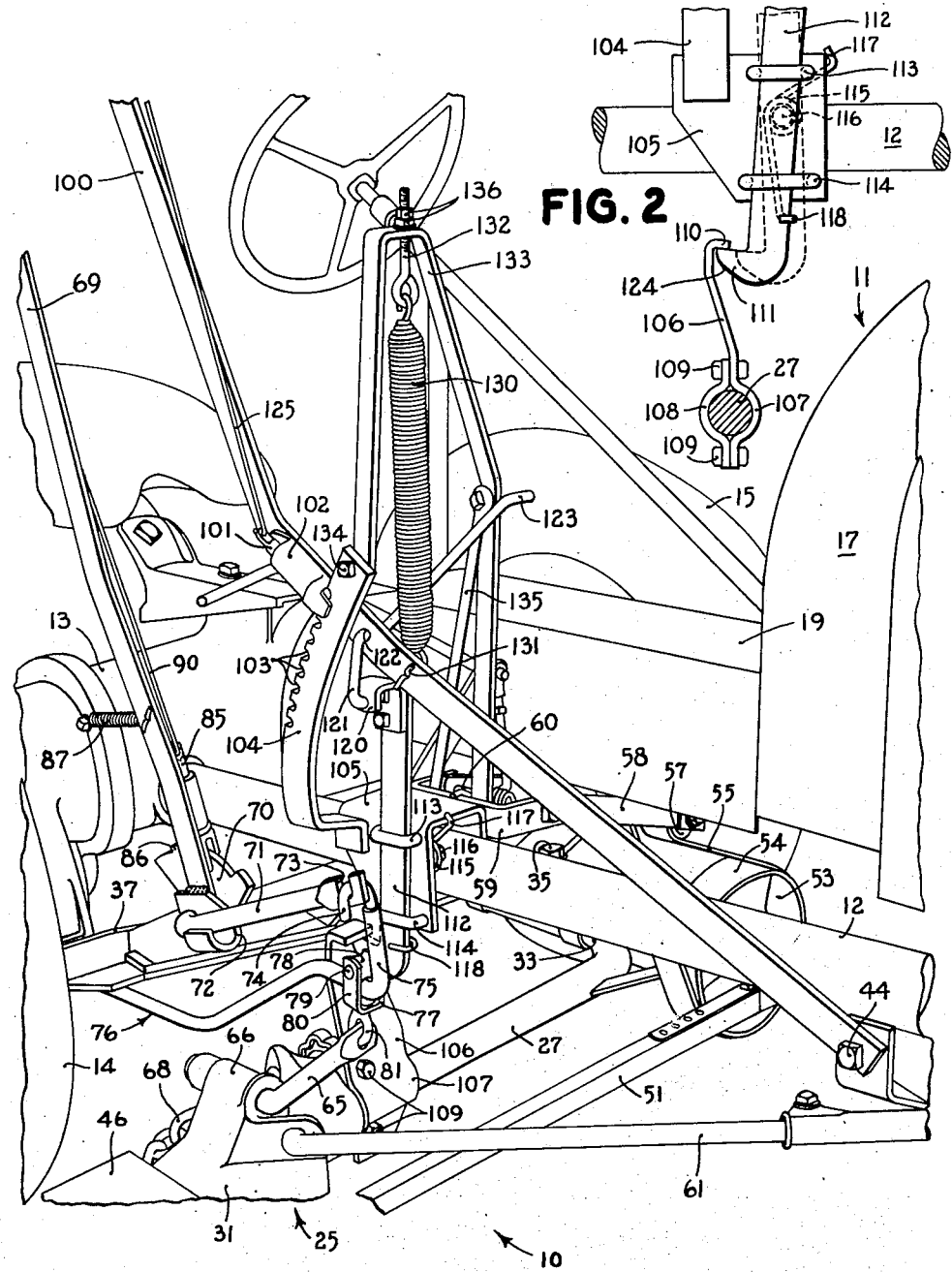
Figure 5:
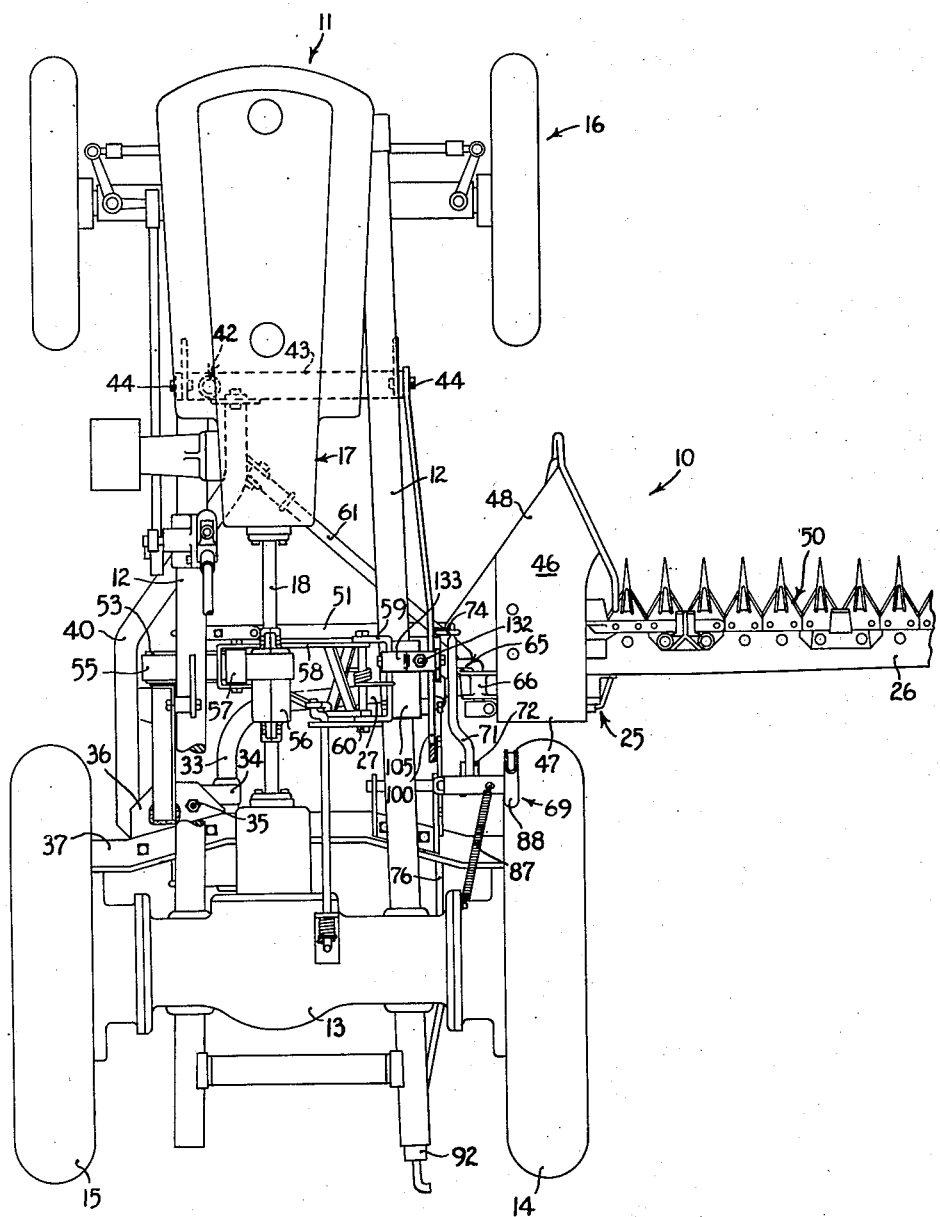
Figure 5 is a plan view of the tractor-mounted mower.

Referring now to the drawings, the mower disclosed in this embodiment of my invention is of the type disclosed by W. J. Coultas in an application Serial No. 257,804, filed February 23, 1939. The mower, indicated generally by reference numeral 10, is mounted on a tractor 11 comprising a frame which includes a pair of longitudinally extending laterally spaced tubular frame members 12. The rear ends of the frame members are fixed to a transversely extending rear axle housing 13 at opposite ends of which are mounted a pair of rear traction wheels 14, 15, respectively. The forward ends of the frame members are supported on a front dirigible truck 16 and on the front end of the frame is carried an engine housing 17, out of which extends rearwardly a propeller shaft 18 for driving the tractor wheels 14, 15 (see Figures 3 and 4). Normally the propeller shaft 18 is protected by a guard casing 19, shown in Figure 1.

The mower 10 comprises a cutter bar structure 25 which includes generally a cutter bar 26 of more or less conventional design, supported on a supporting arm 27. The inner end of the cutter bar 26 is carried on a conventional shoe 28 pivotally connected by a pair of aligned pivot bolts 29, 30 to a shoe arch 31 (see Figure 3). The pivot bolts 29, 30 are longitudinally aligned to provide for vertical swinging movement of the cutter bar 26 in a transversely extending vertical plane. The shoe arch 31 is carried on a sleeve 32, which is journaled on the outer end of the supporting arm 27, providing for a limited amount of tilting movement of the shoe 28 with respect to the arm 27 as is well known to those skilled in the art. The opposite end of the arm 27 is provided with a rearwardly extending portion 33, which is journaled in a supporting casing 34 (see Figure 3) thus providing for vertical swinging movement of the supporting arm 27 about a fore and aft extending axis. The supporting casting 34 is pivotally connected by means of a pivot bolt 35 to a plate 36 carried on a transverse frame member 37 which is supported on the rear axle housing 13. Thus the mower cutter bar structure is freely swingable horizontally about the vertical axis of the pivot bolt 35. The structure is normally held in a transversely extending operating position, however, by means of a latch arm 40 fixed at its rear end to the supporting casting 34 and extending forwardly therefrom. The forward end 41 of the latch arm 40 is held by means of a suitable spring latch mechanism 42 carried on a support 43 which is fixed to the tractor frame by means of bolts 44. The details of the latch mechanism 42 have nothing to do with the present invention and are therefore not disclosed herein for the sake of simplicity, but suffice it to say that the latch 42 is yieldable when the cutter bar 26 encounters an obstruction in the field, thereby permitting the cutter bar structure to swing rearwardly about the pivot bolt 35 to clear the obstruction.

Inasmuch as the cutter bar structure is pivoted at one side of the tractor and extends across under the frame of the tractor and laterally therefrom at the opposite side of the tractor in front of the rear wheel of the latter, it is obvious that as the cutter bar swings rearwardly upon encountering an obstruction, it swings into contact with the tractor wheel. In order to provide for swinging the cutter bar around to its trailing position behind the tractor, a ramp or shield 46 is provided over the shoe arch 31 to permit the tractor wheel to roll over the cutter bar structure as the latter swings rearwardly. The ramp 46 is curved downwardly at 47 at the rear end thereof, and is also curved downwardly at 48 at the forward end thereof to facilitate the passing of the wheel over the ramp and to lift the rear wheel tire without damage thereto.

The mower is provided with a reciprocating sickle 50 which is driven in a conventional manner by means of a pitman 51 connected to the sickle 50 by means of a ball and socket joint 52. The opposite end of the pitman 51 is journaled on a suitable crank carried on a flywheel 53 which is mounted on a shaft 53' journaled for rotation about a fore and aft extending axis on the supporting casting 34. The outer surface 54 of the flywheel 53 serves as a pulley to receive the belt 55 which is trained over a driving pulley 56 on the propeller shaft 18. During operation, the belt 55 is maintained tight in power transmitting relation by means of an idler pulley 57 carried on an arm 58 which is swingably supported on a bracket 59 by means of a bolt 60. The bracket 59 is fixed to the tractor frame member 12. When the cutter bar structure swings rearwardly, the pulleys 53, 56 swing closer together and loosen the belt, thereby interrupting the drive to the sickle 50. The latch bar 40 is braced to the shoe arch 31 by means of a tie rod 61 which is swingably connected to permit the arm 27 to swing vertically in a transverse plane.

The cutter bar 26 is swung upwardly about the pivot bolts 29, 30 to an inoperative position for transport, by means of a more or less conventional arrangement of a bell crank lever 65 journaled in a lug 66 on the shoe arch 31 and connected to an upwardly extending arm 67 on the cutter bar 26 by means of a chain 68. It is with the control of the bell crank 65 that one feature of my invention is directly concerned. A hand control lever 69 is pivotally carried on a plate 70 which is rigidly supported on the transverse member 37. This lever 69 is journaled on an arm 71, the rear end of which is in turn swingably carried on the plate 70, thus providing for independent swinging movement of the arm 71 and the control lever 69. When the lever 69 is pulled rearwardly, however, the arm 71 is raised by virtue of a cradle member 72 which is fixed, as by welding, to the lever 69 and extends under the arm 71. The arm 71, however, is free to be swung upwardly out of the cradle member 72. The outer end of the arm 71 is provided with an open slot 73 in which is supported a hook 74 which is fixed on the upwardly turned forward end portion 75 of a rod 76 serving as a track for a track follower 77. The track follower 77 comprises a pulley or roller 78 which is adapted to roll along the track 76 and is journaled on a pin 79 supported on a U-shaped clevis 80. The clevis 80 is connected to the end of the bell crank 65 by means of an eye bolt 81. When the cutter bar structure of the mower is disposed in normal operating position, the track follower 77 is disposed at the forward end of the track 76 immediately behind the upwardly turned section 75. During operation the cutter bar is free to move up and down and follow the contour of the ground, but when it is desired to raise the cutter bar to inoperative or transport position, the lever 69 is pulled rearwardly, thereby raising the arm 71 by means of the cradle 72 and thus raising the track 76 and the track follower 77 and thereby swinging the bell crank 65 upwardly to raise the cutter bar. The cutter bar is retained in transport position by means of a movable latch member 85 on the lever 69, which is adapted to engage behind a projection 86 on the edge of the plate 70, the upper edge of which is formed in a circular arc about the axis of movement of the lever 69. A spring 87, connected between the lever 69 and the rear axle housing 13, prevents the lever from dropping forwardly out of convenient reach of the operator. To lower the cutter bar to operative position, the latch member 85 is disengaged from the projection 86 by an actuating lever 88 pivoted at 89 at the upper end of the control lever 69 and connected to the latch member 85 by means of a rod 90.

The track rod 76 extends substantially horizontally and rearwardly for a short distance to provide a supporting portion for the track follower when the latter is in normal position. From this point the rod bends downwardly under the rear axle housing of the tractor and the rear end of the rod is bent upwardly at 91 to a supporting bracket 92 fixed to the tractor frame. The rear end of the rod 91 is held loosely in the bracket 92 to permit the rod to swing laterally about the front and rear points of support. When the cutter bar structure swings rearwardly, the track follower 77 slides rearwardly along the rod 76, and inasmuch as the latter moves in an arc about the pivot bolt 35, there is a component of movement transversely across the tractor. To accommodate this transverse movement of the track follower, the track 76 swings laterally in its front and rear points of support to the position shown in Figure 4.

When the mower is used for cutting grass along curbings on boulevards and highways, it is desirable that the cutter bar be supported at the curb level in order to obviate the necessity of raising the cutter bar every time it is necessary to cross a street intersection. This is accomplished by providing an adjustable supporting lever for setting the height of the supporting arm 27 relative to the tractor frame. It is evident, however, that the mower must be immediately released from its elevated position whenever the latch bar 40 is released from the holding latch 42 to allow the cutter bar to swing rearwardly to clear an obstruction, since the tractor wheel must ride over the ramp 46 during this operation. For this purpose I have provided a hand lever 100 pivotally supported on the bolt 44 on the tractor frame for vertical swinging movement and extending upwardly and rearwardly therefrom to a position within convenient reach of the operator of the tractor. The position of the lever 100 is determined by a latch pawl 101 which slides in a guide 102 on the lever and engages any of a series of notches 103 in a sector 104 which is rigidly attached to a bracket 105 supported on the tractor frame member 12. Fixed to the outer end of the cutter bar supporting arm 27 is a latch element 106 comprising a plate, the lower end of which is curved to fit the arm 27, as at 107, and is clamped thereto by means of a cooperating strap 108 disposed on the opposite side of the arm 27 and secured to the element 106 by a pair of clamping bolts 109. The plate 106 extends upwardly from the arm 27 in a transversely extending plane and the upper end of the plate is bent forwardly to provide a latch support 110 which is adapted to cooperate with and be supported by a rearwardly extending hooked portion 111 at the lower end of a vertically slidable member 112 which is confined within a pair of vertically spaced U-shaped guides 113, 114, respectively. The U-shaped guide rods 113, 114 are horizontally disposed with their ends inserted through suitable apertures provided in the bracket plate 105, in which they are secured by any suitable means. The upper guide 113 is adapted to closely embrace the slidable member 112 to prevent any fore and aft sliding movement of the latter, while the lower guide 114 is made appreciably longer, thus permitting the member 112 to be swung in a longitudinally extending vertical plane with the upper guide 113 serving as a fulcrum and the lower guide 114 providing a slot within which the lower end of the slidable member 112 can be moved into and out of engagement with the latch portion 110 of the element 106. The two cooperative latching portions 110, 111 of the members 106, 112, respectively, are held in engagement with each other during operation by means of a coil spring 115 which embraces and is supported on a bolt 116 fixed to the inner side of the bracket 105. The spring 115 has an upper end 117 which engages the bracket 105, the opposite end 118 being disposed in engagement with the lower portion of the slidable member 112 and biased to force the latter rearwardly into engagement with the latch portion 110. At the upper end of the slidable hook member 112 is bolted an inverted U-shaped connecting bracket 120. This bracket is connected to the lever 100 by means of a vertically extending link 121. The upper end of the link 121 extends through an opening 122 in the lever 100 and continues upwardly from the opposite side of the lever to form a handle 123 by means of which the sliding member 112 can be rocked within the guides 113, 114. Thus by pushing forwardly on the handle 123, the link 121 is swung rearwardly, thereby swinging the lower portion of the slidable member 112 forwardly against the pressure of the spring 115 and disengaging the latching portions 110, 111, in the position shown in dotted lines in Figure 2. The purpose of this handle 123 is to provide means for easily disengaging the latch for dropping the cutter bar down to ground level after it has been used along a curb. The supporting arm 27 can be picked up once more for elevation to the curb level by releasing the latch pawl 101 from the notch 103 and moving the lever 100 downwardly and thereby sliding the latch element 112 downwardly against the top of the latch plate 106. The lower edge 124 of the hook portion 111 is inclined to provide a camming action as the edge engages the latch portion 110 to force the hook forwardly against the action of the spring 115 to clear the latch portion 110 after which the spring 115 returns the hook 111 into engagement with the corresponding latch portion 110, after which the lever 100 may be raised once more, carrying with it the cutter bar supporting arm 27. The arm 27 may be set at any desired cutting height by releasing the latch pawl 101 into engagement with one of the notches 103. The latch pawl 101 is controlled by a lever 126 at the end of the handle 100 and connected to the pawl by means of a connecting rod 125.

The lifting of the cutter bar supporting arm 27 is facilitated by means of a counterbalancing spring 130 connected at its lower end to the lever 100 by means of a cotter pin 131. The spring 130 extends upwardly therefrom and is anchored at its upper end to an eye-bolt 132 to a framework 133 comprising an inverted U-shaped strap member, one end of which is connected by a bolt 134 to the upper end of the sector 104 and the other end of the U-shaped member is supported on the bracket 59. The support 133 is rigidly braced by means of an inclined bracing member 135 connected between the support 133 and the bracket 59. The eye-bolt 132 extends upwardly through a suitable aperture in the top of the support 133 and is secured thereto by means of a pair of nuts 136 threaded on the end thereof. The tension in the spring 130 can be adjusted by adjusting the nuts 136 along the eye-bolt 132.

For operation of the mower in the field or along a highway which has no curbing, the mower is dropped to ground level by pressing forward on the handle 123, releasing the latch hook 111. When it is desired to cut along a curbing, the supporting arm 27 is raised by lowering the lever 100 until the latching portions 110, 111 become engaged and then raising the arm 27 to the desired level. This high cutting feature may also be brought into use when it is desired to cut the heads from grain in a field but leaving most of the straw uncut. When the mower is in high cutting position and encounters a stump or other obstruction, causing the latch 42 to release the mower for rearward swinging movement, the latch element 110 is disengaged from the hook 111, thereby dropping the cutter bar immediately to the ground in position for the rear tractor wheel to roll over the ramp to permit the mower to swing rearwardly to trailing position behind the tractor.

I claim:

1. In a mower, a frame, a cutter bar structure swingably connected thereto, and means for supporting said structure comprising a track carried on said frame and extending in the direction of swinging movement of said structure, and a track follower on said track connected to said structure at a position spaced from the swingable connection thereof and adapted to follow said track as the cutter bar structure swings.

2. In a mower, a frame, a cutter bar structure swingably connected thereto, and means for lifting and supporting said structure comprising a lifting lever pivoted on said frame, a track carried on said lever and extending in the direction of swinging movement of said structure, and a track follower on said track connected to said structure at a position spaced from the swingable connection thereof and adapted to follow said track as the cutter bar structure swings.

3. In a mower, a wheel supported frame, an arm swingably connected thereto for vertical and horizontal swinging movement, a cutter bar mounted on said arm by means providing for vertical swinging movement of said cutter bar relative to said arm, means for swinging said cutter bar vertically on said arm including a lever mounted on said frame, a track carried by said lever to be raised and lowered thereby, and a track follower engaging said track and connected to said cutter bar and adapted to move along said track as said arm and cutter bar swing rearwardly, and means for raising and supporting said arm relative to said frame comprising a second lever mounted on said frame, and means connecting said second lever with said arm.

4. In a mower, a wheel supported frame, a cutter bar structure pivotally connected thereto by means providing for swinging said structure rearwardly from operating position when the latter meets an obstruction in the field, a lifting lever pivoted on said frame, and means including a latch connecting said lever to said structure for lifting the latter in operating position, said latch being disengageable by rearward movement of said structure.

5. In a mower, a wheel supported frame, a cutter bar structure pivotally connected thereto by means providing for swinging said structure rearwardly from operating position when the latter meets an obstruction in the field, a lifting lever pivoted on said frame, and means connecting said lever to said structure for lifting the latter in operating position, including a rearwardly facing hook engageable with said structure, the latter being readily disengaged from said hook when said structure swings rearwardly.

6. In a mower, a wheel supported frame, a cutter bar structure pivotally connected thereto by means providing for swinging said structure rearwardly from operating position when the latter meets an obstruction in the field, a lifting lever pivoted on said frame, and means connecting said lever to said structure for lifting the latter in operating position, including a vertically slidable member supported in guides on said frame and having a hooked portion adapted to engage said arm and means connecting said member and said lever, said arm being readily disengaged from said hook when said structure swings rearwardly.

7. In an implement, a supporting frame, a tool swingably connected thereto for movement out of and into operating position, means releasably holding said tool in operating position, a track carried on said frame and extending in the direction of swinging movement of said tool, and a track follower on said track and connected to said tool at a position spaced from the swingable connection thereof and adapted to follow said track as the tool swings.

8. In an implement, a supporting frame, a tool swingably connected thereto for movement out of and into operating position, means releasably holding said tool in operating position, a track carried on said frame and extending in the direction of swinging movement of said tool, and a track follower on said track and connected to said tool at a position spaced from the swingable connection thereof and adapted to follow said track as the tool swings, and means for raising and lowering at least one end of said track.

9. In a mower, a wheel-supported frame, a cutter bar structure pivotally connected thereto for horizontal swinging movement relative thereto out of operating position when the mower meets an obstruction in the field, and means for lifting and supporting said structure comprising a lifting lever mounted on said frame, a track carried on said lever and raised and lowered thereby, and a track follower on said track attached to said structure and adapted to move along said track when the structure swings rearwardly relative to said frame.

10. In a mower, a wheel-supported frame, a cutter bar structure pivotally connected thereto for horizontal swinging movement relative thereto out of operating position when the mower meets an obstruction in the field, and means for lifting and supporting said structure comprising a lifting lever mounted on said frame, a track member having one end supported on said lever and the other end supported on said frame, and a track follower on said track attached to said structure and adapted to move along said track when the structure swings rearwardly relative to said frame.

11. In a mower, a wheel-supported frame, a cutter bar structure pivotally connected thereto for horizontal swinging movement relative thereto out of operating position when the mower meets an obstruction in the field, and means for lifting and supporting said structure comprising a lifting lever mounted on said frame, a longitudinally extending track member spaced below said lever and having means for swingably suspending the member therefrom providing a limited lateral swinging movement relative thereto, and a track follower on said track attached to said structure and adapted to move along said track when the structure swings rearwardly, said track being adapted to swing laterally to accommodate the swinging movement of said structure.

12. In a mower, a wheel-supported frame, an arm pivotally connected thereto for horizontal swinging, a cutter bar mounted on said arm by means providing for vertical swinging movement of said cutter bar relative to said arm, and means for swinging said cutter bar vertically comprising a lever pivoted on said frame, a track carried by said lever, and a track follower engaging said track and connected to said cutter bar and adapted to move along said track when said arm swings horizontally.

13. In a mower, a wheel-supported frame, an arm supported on said frame by means providing for vertical and horizontal swinging movement relative thereto, a cutter bar hinged to said arm for vertical swinging movement, a lever pivoted on said frame, and a pair of disengageable latching elements on said lever and said arm, respectively, means for yieldingly supporting one of said elements so that said elements will latch together when the lever is swung downwardly with the arm in operating position and be retained in latched relation to permit the arm to be raised and lowered by said lever, and said latching elements being disengaged when said arm is swung horizontally relative to said frame.

14. In a mower, a wheel-supported frame, an arm supported on said frame by means providing for vertical and horizontal swinging movement relative thereto, a cutter bar hinged to said arm for vertical swinging movement, a lever pivoted on said frame, and a latching element connected to said lever, a guide on said frame, means for supporting said element for vertical sliding movement and limited swinging movement in a vertical plane on said guide, a hooked portion on said element adapted to engage said arm, and spring means for holding said slidable member in engagement with said arm during normal operation, said latching element being disengaged from said arm by horizontal swinging movement of said arm.

15. In an implement, a supporting frame, a tool releasably held in operating position, a lifting member on the frame for lifting and holding said tool in elevated position, and disengageable means releasably connecting said member with said tool, said last named means being disengaged by movement of said tool out of operating position, and means for reengaging said releasable means by movement of said tool to operating position.

16. In an implement, a supporting frame, a tool member swingably connected thereto for vertical and horizontal movement, a lifting member on the frame for lifting and holding said tool in elevated position, and means connecting said members including a track on one of said members and a track follower on said track and connected to the other of said members and adapted to follow said track as said tool member swings horizontally.

CARL J. FREDERIKSEN.